J. C. GARNER.

Whiffletree.

No. 2,312.

Reissued July 10, 1866.

Witnesses:

W. P. Langston

Wm. Grewin

Inventor:

John C. Garner per Munn & Co

Attorneys

AM. PHOTO-LITHO. CO. N.Y. (OSBORNE'S PROCESS.)

UNITED STATES PATENT OFFICE.

JOHN C. GARNER, OF ASHLAND, PENNSYLVANIA.

IMPROVEMENT IN WHIFFLETREE ATTACHMENTS.

Specification forming part of Letters Patent No. 51,712, dated December 26, 1865; Reissue No. 2,312, dated July 10, 1866.

*To all whom it may concern:*

Be it known that I, JOHN C. GARNER, of Ashland, in the county of Schuylkill and State of Pennsylvania, have invented a new and Improved Whiffletree and Double-Tree Attachment; and I do hereby declare that the following is a full, clear, and exact description thereof, which will enable those skilled in the art to make and use the same, reference being had to the accompanying drawings, forming part of this specification, in which—

Figure 1:
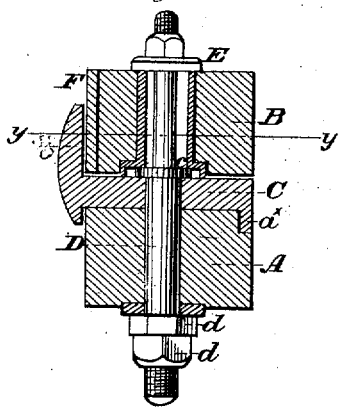
Figure 3:
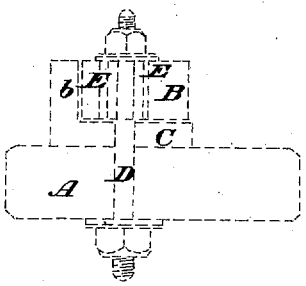
Figure 2:
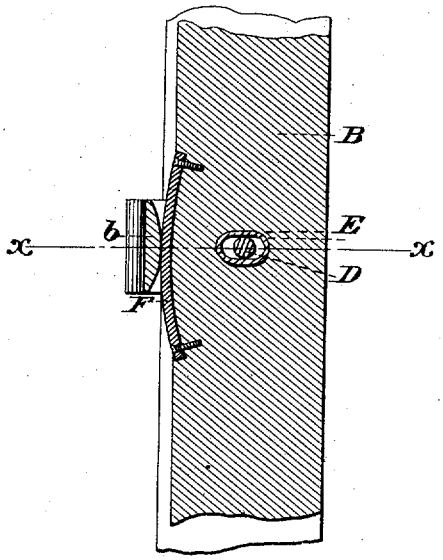
Figure 4:
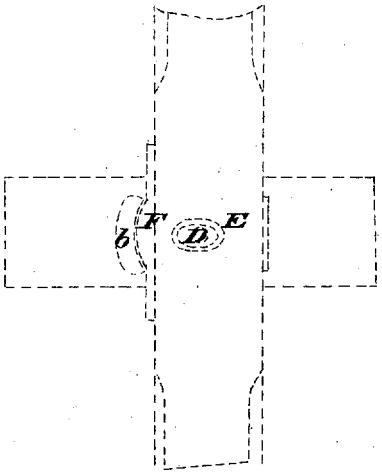

Figure 1 is a transverse vertical section of my invention, taken in the line *x x*, Fig. 2; Fig. 2, a horizontal section of the same, taken in the line *y y*, Fig. 1; Figs. 3 and 4, modifications of Figs. 1 and 2.

Similar letters of reference indicate corresponding parts.

This invention consists in attaching a whiffletree to the cross-bar of the thills, or to a double-tree, and attaching a double-tree to the draft-pole of a vehicle in such a manner that the connecting-bolt will be relieved from all strain under the pull or draft of the team, and the bolt as well as the whiffletree or double-tree thereby prevented from bending or breaking.

A represents the cross-bar of a pair of thills, and B a whiffletree attached thereto. On the cross-bar A, at about its center, there is placed a metal plate, C, which is fitted in a recess or groove made transversely in the bar, the plate extending the whole width of the bar and having a lip, *a*, at its front end projecting downward to catch over the front edge of bar A, and also a lip, *b*, which extends upward in front of the whiffletree more than half of the height of the latter, as shown clearly in Fig. 1. The plate also has a lip, $a^{\times}$, at its rear end, as shown in Fig. 1. This plate and its lips may be of malleable cast-iron and all cast in one piece. The inner surface of the lip *b* is rounded or of convex form, as shown clearly in Fig. 2.

The plate C is secured to the cross-bar A by means of a bolt, D, which may be of wrought-iron, and passes through said bar, the bolt having a shoulder, *c*, upon it, which rests or bears upon the upper surface of C, and the lower part of the bolt, underneath the cross-bar, having screw-nuts *d* upon it. (See Fig. 1.)

The bolt D passes up through the whiffletree B and through a metal tube, E, which is of elliptical form in its transverse section, the major diameter being in a direction transverse with the whiffletree. (See more particularly Fig. 2.)

To the front side of the whiffletree there is secured, by screws or otherwise, a metal plate, F, the exterior surface of which is convex in a longitudinal direction, as shown in Fig. 2.

The whiffletree rests and turns or works upon the shoulder *c* of the bolt, and is secured thereon by a nut, G, on the upper part of the bolt.

I would remark that the inner surface of the lip *b* may be of concave form and the exterior surface of the metal plate F of corresponding convex form, as shown in Fig. 4.

From the above description it will be seen that the whiffletree, under the pull or draft of the team, will not bear upon the bolt D, but against the lip *b* of plate C, the plate F at the front side of the whiffletree bearing against said lip *b*. The elliptical tube E does not admit of the whiffletree bearing against the bolt D, as will be clearly seen by referring to Fig. 2, said tube being sufficiently wide at its larger diameter to allow for wear of the lip *b* and plate F.

A double-tree may be attached to a draft-pole in the same manner as above described, and the whiffletrees also attached to the double-tree in the same way.

The bolt D, it will be seen, is relieved from all strain and the whiffletree rendered stronger or less liable to break in consequence of the bearing being against its front edge.

Having thus described my invention, I claim as new and desire to secure by Letters Patent—

The plate C, provided with the lips, as shown, and secured to the bar A by the bolt D, in combination with the tube E, fitted in the whiffletree, and the plate F at the front side of the latter, the bolt D passing through the tube E, and all arranged to operate in the manner substantially as and for the purpose herein set forth.

The above specification of my invention signed by me this 2d day of March, 1866.

JOHN C. GARNER.

Witnesses:

M. M. LIVINGSTON,

ALEX. F. ROBERTS.